US005566346A

United States Patent [19]
Andert et al.

[11] Patent Number: 5,566,346
[45] Date of Patent: Oct. 15, 1996

[54] SYSTEM FOR CONSTRUCTING HARDWARE DEVICE INTERFACE SOFTWARE SYSTEMS INDEPENDENT OF OPERATING SYSTEMS INCLUDING CAPABILITY OF INSTALLING AND REMOVING INTERRUPT HANDLERS

[75] Inventors: Glenn P. Andert, Cupertino; Steven P. Lemon, Los Gatos, both of Calif.

[73] Assignee: Taligent, Inc., Cupertino, Calif.

[21] Appl. No.: 171,724

[22] Filed: Dec. 21, 1993

[51] Int. Cl.⁶ .............................. G06F 13/10; G06F 13/14
[52] U.S. Cl. .................... 395/828; 395/650; 395/600; 395/726; 395/733; 364/146; 364/230.2; 364/280; 364/280.8
[58] Field of Search .................................. 395/821, 828, 395/600, 650, 726, 733

[56] References Cited

U.S. PATENT DOCUMENTS

| | | | |
|---|---|---|---|
| 4,530,052 | 7/1985 | King et al. | 364/200 |
| 4,533,996 | 8/1985 | Hartung et al. | 364/200 |
| 4,597,044 | 6/1986 | Circello | 364/200 |
| 4,821,220 | 4/1989 | Dulsberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. . | |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,301,277 | 4/1994 | Kanai | 395/275 |
| 5,333,319 | 7/1994 | Silen | 395/650 |

FOREIGN PATENT DOCUMENTS 574691  12/1993  European Pat. Off. .

OTHER PUBLICATIONS

Journal Of Systems And Software, V.9(1), Jan. 1989, US, pp. 41–49, Shieh et al. "Extending a Stand Alone Personal Computer to Integrate Multiple Operating Systems Concurrently".

*Primary Examiner*—Thomas C. Lee
*Assistant Examiner*—Rehana P. Kriek

[57] ABSTRACT

An object-oriented input/output (IO) system represents an interface between clients of the IO system and peripheral devices, such that the clients can access the peripheral devices by utilizing IO services offered by the IO system. The IO system includes one or more object-oriented IO servicers for receiving IO service requests from clients, and for generating IO commands in accordance with the IO service requests. One or more object-oriented access managers, coupled to the IO servicers and the peripheral devices, access the peripheral devices as instructed by the IO commands such that the IO service requests are satisfied. The peripheral devices may transmit interrupts to a kernel while operating in accordance with the IO commands. One or more object-oriented interrupt servicers, coupled to the kernel receive and decode the interrupts from the peripheral devices. One or more object-oriented interrupt handlers, coupled to the interrupt servicers, process the decoded interrupts. The IO system cited here includes an operating system independent execution environment for the various I/O servicers, each of which is designed in such a way as to support a variety of interchangeable operating systems.

23 Claims, 6 Drawing Sheets

SYSTEM FOR CONSTRUCTING HARDWARE DEVICE INTERFACE SOFTWARE SYSTEMS INDEPENDENT OF OPERATING SYSTEMS INCLUDING CAPABILITY OF INSTALLING AND REMOVING INTERRUPT HANDLERS

BACKGROUND OF THE INVENTION

1. Field of the Invention

The present invention is generally directed to an input/output architecture for a computer system, and more particularly directed to an object-oriented input/output architecture for a computer system.

2. Related Art

A typical computer includes an input/output (IO) system to interface with peripheral devices which are connected to the computer. This IO system serves as an interface between resources of the computer system and the peripheral devices. This IO system also serves as an interface between programs executing on the computer system and the peripheral devices.

IO systems are typically implemented using conventional "procedure-oriented" software programming techniques (as opposed to object-oriented or rule-based software programming techniques). As will be appreciated, software programs produced using procedure-oriented software programming techniques are often not easily extendible. Also, often such software programs cannot be easily reused. Thus, conventional IO systems are often not easily extendible, and the software associated with such IO systems are often not easy to reuse.

Typically, an IO system is implemented such that it is specific to a single operating system. The IO system responds to and correctly processes the IO function calls which are associated with the operating system, but the IO system does not have the capability to support any other operating systems. There is a growing need for computers which support multiple operating systems. Clearly, a computer which uses a conventional IO system is at a disadvantage in today's market since it can support only the operation system which the IO system supports.

Thus, what is requirect is an input/output system for a computer which is easily extendible, which embodies software which is easy to reuse, and which supports multiple operating systems.

SUMMARY OF THE INVENTION

The present invention is directed to an object-oriented input/output (IO) system for use with a computer platform having a kernel and interacting with a plurality of peripheral devices. The IO system represents an interface between clients of the IO system and the peripheral devices, such that the clients can access the peripheral devices by utilizing IO services offered by the IO system.

The IO system includes one or more object-oriented IO servicers for receiving IO service requests from clients, and for generating IO commands in accordance with the IO service requests. One or more object-oriented access managers, coupled to the IO servicers and, the peripheral devices, access the peripheral devices as instructed by the IO commands such that the IO service requests are satisfied. The peripheral devices may transmit interrupts to the kernel while operating in accordance with the IO commands.

One or more object-oriented interrupt servicers, coupled to the kernel, receive and decode the interrupts from the peripheral devices. One or more object-oriented interrupt handlers, coupled to the interrupt servicers, process the decoded interrupts.

The IO servicers are each instantiated from an object-oriented IO service framework. Similarly, the access managers are each instantiated from an object-oriented access manager framework, the interrupt servicers are each instantiated from an object-oriented interrupt services framework, and the interrupt handlers are each instantiated from an object-oriented interrupt handlers framework.

The IO services are designed and interfaces specified in an architecture which enables a variety of operating systems to map their IO interface syntax and semantics to the architected IO services. The invention also provides an OS independent environment or these IO servers to execute within.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Overview

A preferred embodiment is directed to an input/output (IO) system for a computer. The IO system of a preferred embodiment is easily extendible, embodies software which is easy to reuse, and supports multiple operating systems. Other advantages of a preferred embodiment are discussed below.

Object technology is used to implement the IO system of a preferred embodiment. Thus, the a preferred embodiment represents an object-oriented IO system. The use of object technology is pervasive and supports abstractions for many low-level services such as interrupt processing which to date have been processor-specific and procedural in nature. These generalized object based abstractions, together with the use of micro-kernel technology, enable the generation of a new model for device interfacing.

The IO system of a preferred embodiment is an association of service providers and their clients. In order to provide a meaningful service to its clients, the IO system becomes a client of several other service providers.

Figure 10:
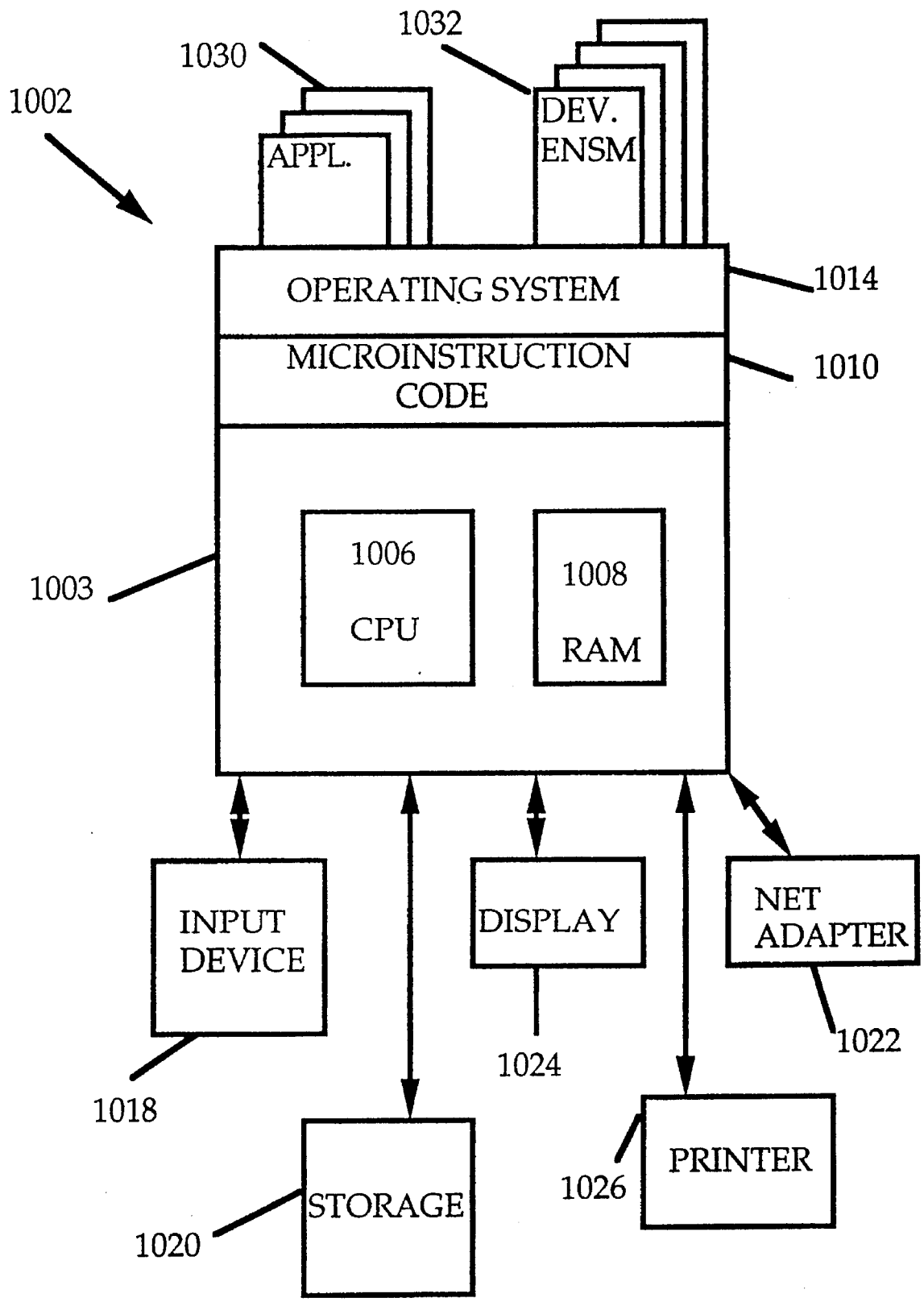
FIG. 10 is a block diagram of a computer platform on which the IO system of a preferred embodiment operates.

FIG. 10 illustrates a block diagram of a computer platform 1002 in which the object-oriented IO system in accordance with a preferred embodiment. It should be noted that a preferred embodiment alternatively encompasses the IO system in combination with the computer platform 1002.

The computer platform 1002 includes hardware components 1003, such as a random access memory (RAM) 1008 and a central processing unit (CPU) 1006. It should be noted that the CPU 1006 may represent a single processor, but preferably represents multiple processors operating in parallel.

The computer platform 1002 also includes peripheral devices which are connected to the hardware components 1003. These peripheral devices include an input device or devices (such as a keyboard, a mouse, a light pen, etc.) 1018, a data storage device 1020 (such as a hard disk or floppy disk), a display 1024, a printer 1026, and a network adapter 1022. The computer platform 1002 could be connected to other peripheral devices.

The computer platform 1002 also includes an operating system 1014, and may include microinstruction code 1010 (also called firmware). The operating system 1014 may represent a substantially full-function operating system, such as the Disk Operating System (DOS) and the UNIX operating system. However, the operating system 1014 may represent other types of operating systems. Preferably, the operating system 1014 represents a limited functionality operating system, such as the Mach micro-kernel developed by IBM, which is well-known to those skilled in the relevant art. Full featured operating systems may operate as application programs 1030 on the computer platform 1002.

In a preferred embodiment, the computer platform 1002 is an International Business Machines (IBM) computer or an IBM-compatible computer. In an alternative embodiment, the computer platform 1002 is an Apple computer.

One or more application programs 1030 operate in parallel on the computer platform 1002. Also, one or more device ensembles 1032 operate on the computer platform 1002. The device ensembles 1032 collectively represent the object-oriented system of a preferred embodiment. The device ensembles 1032 operate with each other to provide IO services to end users (such as the applications 1030). The device ensembles 1032 are discussed in greater detail below.

As discussed above, the applications 1030 may represent operating systems, such as IBM OS/2. Since these applications 1030 are clients of the device ensembles, the IO system of a preferred embodiment supports a plurality of operating systems.

The elements of the computer platform 1002 could be depicted in FIG. 10 in other ways. For example, the device ensembles 1032 could be illustrated as being part of the operating system 1014 (such that the device ensembles 1032 and the operating system 1014 would occupy the same layer in the computer platform 1002).

OVERVIEW OF SELECTED OBJECT-ORIENTED TECHNOLOGY CONCEPTS

Object-orient technology and computer programming techniques are generally well known and described in many publicly available documents, such as *Object-Oriented Design* by Grady Booch (Benjamin Cummings 1991) and *Object-Oriented Requirements Analysis and Logical Design* by Donald Firesmith (Wiley 1993). Selected features of object-oriented technology pertinent to the present invention are discussed in this section.

Objects

Two views of object programming have flowed into the object-oriented (OO) industry mainstream: self-supporting stand-alone objects and collaborative lightweight objects. These views are discussed below.

One view of object technology migrates toward the philosophy of "heavy-weight" objects. This object design tends to encapsulate as much as possible into a single, stand-alone entity. An example might be a data base object which encapsulates all the subtleties of a disk-based relational filing system in a single object. Such an object would embody and implement the abstractions of field, tuple, table, relation, index and perhaps query.

This approach yields objects with a large granularity and limits the flexibility of the embodied abstractions. To refine or adapt the field abstraction could very well require intimate knowledge of the data base object's internal structure.

In contrast, the light-weight view of objects tends to limit the scope of individual objects to functionally and semantically consistent puzzle pieces designed to collaborate with (perhaps many) other objects in order to achieve a goal. These are often highly flexible objects which are used (and reused) on a greater scale.

In this view of objects a simple data base might be a collaborative set of field objects associated by tuple objects which are in turn contained by table objects. An index, relation, or query would be separate entities, collaborating approximately with field, tuple, and table. Each of these abstractions is able to provide a consistent interface and each may be easily subclassed to adopt new behaviors.

In a gross simplification, one could draw the analogy between software libraries and individual subroutines when looking at these two different approaches to objects. Both provide some self contained unit of encapsulation and reuse. A preferred embodiment utilizes light-weight, fine granularity, collaborative objects extensively.

Frameworks

To provide necessary structure to the various subsystems, the lightweight objects are woven into the fabric of a design framework in which the public interfaces and inter-relationships are well defined. If objects are the unit of code reuse, frameworks are the unit of design reuse. Frameworks are generally well known. Frameworks can span entire class hierarchies, simultaneously providing the enveloping architecture and expressing the systematic organization of the design. Frameworks may decompose into sub-frameworks or several frameworks may be encompassed by a larger framework.

If the framework is the embodiment of design, then there must be a term to call the set of objects which implement a framework. For example, in C++ classes and objects are often spoken of separately, distinguishing between the two by saying a class is the specification and an object is an instance of the class. According to a preferred embodiment, an implementation "instance" of a framework is called an ensemble. This term "ensemble" indicates those classes which collectively implement a framework. For example, the product which in the past has been called a "device driver" becomes a Device Ensemble.

Frameworks allow commonalty to be managed through collaboration and inheritance between the various pieces of an ensemble. Through the use of well defined class hierarchies, commonalty is pursued and distilled only where it makes sense in the overall design. Each framework may present its clients with an appropriate and desirable interface instead of being confined to a "one-size-fits-all" paradigm enforced across all frameworks.

Features and Advantages of a preferred embodiment

Some features and advantages of the object-oriented IO system of a preferred embodiment were discussed above. Additional features and advantages are discussed in the following sections.

Enabling A Developer

The extensive use of objects and frameworks is new to the field of hardware device interface software and serves to assist the ensemble author in a number of ways. First, the framework serves to guide the author through the design issues of orderly start-up, receiving interrupt notification, servicing device hardware, and orderly shutdown. Second, reuse of ensemble objects with similar characteristics and purposes allows the author to concentrate on only those behaviors which are necessarily different.

For example, the author of an ensemble for a new disk controller card may be able to derive from an existing ensemble, over-riding only those functions which do actual hardware access. In contrast to this, the author of an ensemble for an entirely new piece of hardware may not have the luxury of an ensemble on the shelf to derive from. In this case, many of the low-level IO frameworks defined by a preferred embodiment will assist the effort by providing design and architectural guidance to the author.

Encouraging hardware and software innovation

Conventional hardware and software innovation often suffer from mutual knowledge which is too intimate. Because operating system and application software "know too much" about the underlying hardware platform, they exploit this knowledge for maximum value. Use of this information locks hardware vendors into a mode where change is very hard to accomplish without breaking applications. Additionally, this knowledge makes it difficult for software to escape the least common denominator syndrome.

Using object abstractions throughout low level subsystems allows this deadlock to be resolved. Framework interfaces serve not only to hide the hardware details from the application, they also hide the application details from the hardware. This well defined interface between hardware-dependent and hardware-independent parts of the overall system encourages both hardware and software innovation, since the hardware as well as the object based software can change without effects rippling throughout the entire system.

Location independent device abstractions

By implementing a logical software hierarchy, providing a common abstraction, and utilizing a shared library system, the IO architecture allows the same device ensemble to be used regardless of the physical location or number of occurrences of the hardware. This is to say that an ensemble for a specific UART chip could service both a port on the motherboard planar and a port on a third party expansion card without additional work on the ensemble author's part.

Let resources find you

Another fundamental problem with existing systems is the perspective of the configuration data base(s) involved. The current top-down resource hunting perspective necessitates informing the system explicitly about devices installed or places to look. In some cases, these data bases are used as input to statistically link drivers into the kernel. In some cases, these data bases are used as input to statistically link drivers into the kernel. Configuration files are scattered throughout the system and multiply as new system services are brought on-line. The result is fairly uniform; a plethora of obscure, ill-formed, and usually inconsistent set of steps is required to add a new device.

A better paradigm is one which inverts the current perspective to add a new device. According to a preferred embodiment, this philosophy is called "let resources find you." In the "let resources find you" paradigm a SCSI ensemble would report drives to the mass storage subsystem which would then report mountable logical drives (volumes or partitions) to the file system. In this way the user no longer has responsibility for configuring some database to tell the file system what volumes to mount and the file system is relieved of the burden of probing all possible hard drive interfaces for drives and volumes.

A device may not always have as direct and intuitive a client as in the above example. In these cases a device would register with a central "parts bin" as a non-specific resource. For example, an RS232C port might register itself with the parts bin, later to be pulled from the bin by some user action and used to configure a modem or printer port. In this case, the user is assured that the options presented are valid because only those devices which are available and un-assigned find their way to the parts bin.

"Plug & Play" user model

The culmination of "let resources find you" is the Plug & Play user model. Plug & Play operation frees the user from having to deal with configuration files to add or remove input/output hardware.

Dynamic installation and configuration

The dynamic configuration of both hardware and software is a required feature to support Plug & Play model of a preferred embodiment. To achieve this goal, configuration of device software requires the dynamic installation of device specific software (interface ensembles). For example, a SCSI interface capable of "host-plugging" would need to reconfigure the devices and services it provides as devices are added or removed from the bus.

This capability can be extended into more dynamic scenarios where individual instances of ensemble pieces may be created and destroyed at will, including un-injection or removal of interrupt handling kernel code in an unobtrusive manner.

Flexible abstractions with decentralized policy

Use of flexible abstractions throughout the IO architecture allows many design decisions to be deferred to the framework developer instead of becoming fixed in the base architecture. This increases the options available to the designer and allows him to make the; best set of trade-offs with respect to his problem domain. The set of trade-offs can span performance, security, device allocation, and device access policy issues.

As an example of the, flexibility this provides, each device abstraction will define whether the device can be shared or is limited to one client at a time. Decentralization of this device allocation policy decision allows such policy to change at a later time without having any impact beyond the scope of the particular device.

In addition to defining client/device access policy, the device abstraction must allocate required resources such as IO address space and interrupt source (IRQ). These lower level resources are managed for each IO framework by an interrupt services framework. The coordination of these resources is effectively invisible to the individual IO frameworks unless a conflict occurs.

The effect of decentralized policy is to reduce the number of dependencies a device abstraction needs to deal with and increase the opportunity for the individual framework designer to set proper policies at an appropriate level. The value of decentralized policy becomes more apparent when porting the software to accommodate new hardware systems which diverge from the initial implementation's frame of reference.

Increased system reliability

Current levels of systems reliability achieved by today's common desktop operating system technology are unacceptable for a new system. Progress has been evident in this area with features like protected address spaces and user mode drivers. Even with these advances, IO architectures have not made any significant contribution to the cause of system stability. A preferred embodiment addresses this shortcoming.

Recovery from processor exceptions within interrupt handlers

Most systems are very unforgiving toward exceptions generated while the system is executing interrupt code. The resulting system crash is hardly a model of system reliability and often seems inexplicable. To improve this, the IO architecture of a preferred embodiment supports both default and custom exception handlers for the interrupt domain.

Error Logging

IO Error logging is an effective way to track problems and provide diagnostic feedback when non-fatal errors occur. A preferred embodiment supports flexible services for such logging.

Automatic reclamation of resources

A preferred embodiment achieves proper reclamation of resources. In particular, a preferred embodiment detects, and cleans up after, an abnormal termination.

Support for diverse hardware

A preferred embodiment supports a wide range of devices, processors and buses. The actively supported devices range from simplistic non-interrupt driven devices (for example, the Apple SWIM floppy controller chip) to DMA or channel based disk controllers. A full range of IO buses are supported, once again from the simple (ISA) to the sophisticated (Micro Channel or NuBus). This IO architecture is processor-independent and supports all known processor configurations, including multi-processing.

STRUCTURE OF THE OBJECT-ORIENTED INPUT/OUTPUT SYSTEM

IO Service Frameworks

When an end user orders a piece of equipment he is seldom simply acquiring hardware. Rather, he is instead attempting to obtain some level of service. For example, modem manufacturers provide a means of achieving some level of telecommunication service. Selling modems is just one element of the real transaction.

Accordingly, it is no longer adequate to simply make a device accessible, the focus must shift to the desired services. To this end the IO system of a preferred embodiment is service oriented. Rather than providing Disk Drivers, the system provides Mass Storage Services. The traditional concept of a disk driver is simply a means for software to access a drive. Mass storage services include additional responsibilities such as providing the file system with usable partitions and making provisions for the technical and user interface tasks of drive partitioning and formatting. It is important to recognize that a preferred embodiment expands on the traditional roles of device interfaces by raising the level of service provided.

Some of the input/output services provided by the IO system of a preferred embodiment include (a) Mass Storage IO services; (b) Keyboard processing services; (c) Mouse/Pointing device processing services; (d) SCSI services; (e) Serial communications port services; (f) Expansion bus management services; (g) Desktop bus IO services; and (h) Power management services.

According to a preferred embodiment, IO service frameworks are provided for enabling an end user (such as a human operator, an operating system function, an application program, etc.) to perform these and other input/output services. In particular, an end user can interact with these IO service frameworks to perform any supported input/output operations.

Figure 1:
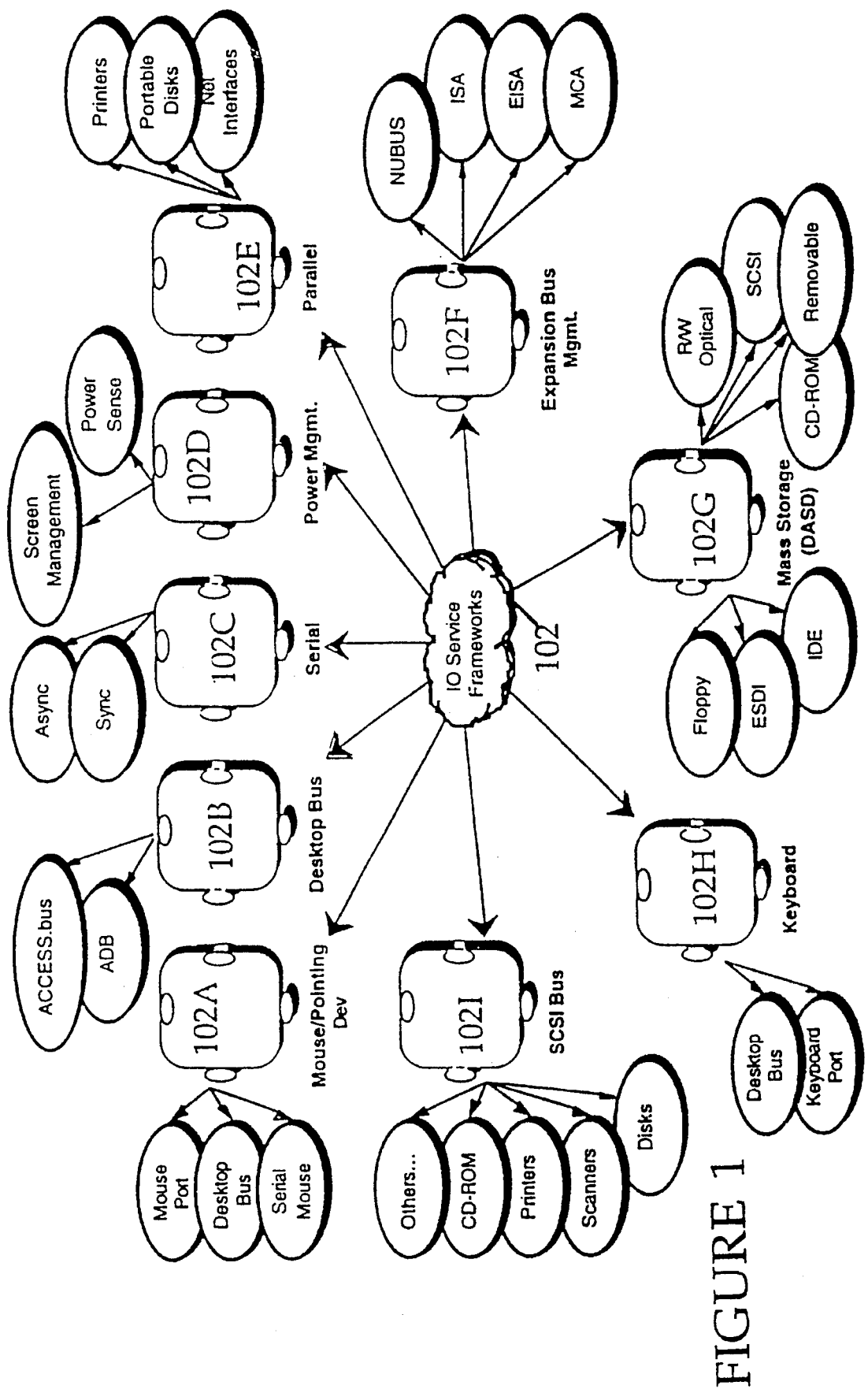
FIG. 1 illustrates input/output service frameworks according to a preferred embodiment of a preferred embodiment.

The major IO service frameworks 102, along with some of the specific services they provide and devices they access, are shown in FIG. 1 (services and devices are shown as ovals). These IO service frameworks 102 include (1) a mouse/pointing device framework 102A, which provides services relating to a mouse port, a desktop bus, and a serial mouse; (2) a desktop bus framework 102B, which provides services relating to an access bus; (3) a serial port framework 102C, which provides services relating to the synchronous and asynchronous transfer of data via serial ports; (4) a power management framework 102D, which provides services relating to power sensing and screen management; (5) a parallel port framework 102E, which provides services relating to interaction with parallel-type devices (such as printers, portable disks, network interfaces, etc.); (6) an expansion bus management framework 102F, which provides services relating to the interaction with expansion buses; (7) a mass storage device framework, which provides services relating to mass storage devices; (8) a keyboard framework 102H, which provides services relating to keyboard input devices; and (9) a SCSI bus framework 102I, which provides services relating to a SCSI bus and devices connected to this bus.

It is entirely possible (in some cases, necessary) for some of these services to become clients of others to achieve the desired goal. For example, in some configurations, the Mass-Storage framework 102G would be a client of the SCSI framework 102I. The SCSI framework 102I could, in turn, be a client of the expansion bus framework 102F. The Pointing Devices framework 102A would have to become a client of the serial port services framework 102C to use a serial port mouse. The IO frameworks 102 are also clients of many other operating system services which are not related to device interfacing.

Underlying IO Frameworks

The IO services frameworks 102, described above, represent an end user's interface to the IO system of a preferred embodiment. The IO services frameworks 102 operate with the following lower-level frameworks to perform their respective tasks: Interrupt Services Framework 206; Interrupt Handler framework 208; and access manager framework 210. These frameworks represent the fundamental building blocks of the IO system.

Figure 2:
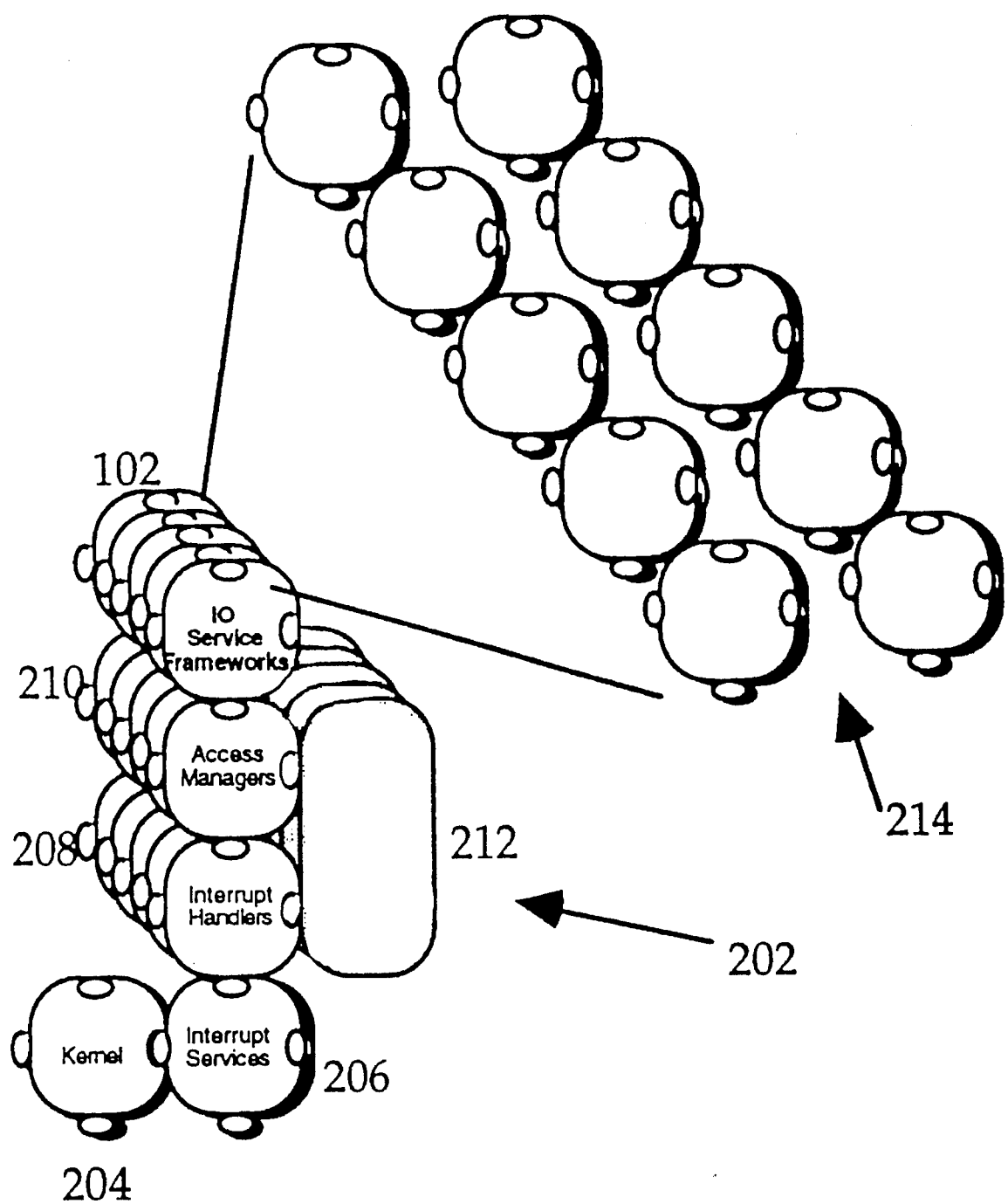
FIG. 2 illustrates an overall structural block diagram of the input/output system of a preferred embodiment.

FIG. 2 illustrates how these frameworks communicate and interact to provide multiple services (as noted above, instantiations of these frameworks are called ensembles, and are shown in FIG. 10 as elements 1032). FIG. 2 essentially represents an overall structural diagram of the IO system of a preferred embodiment.

At the IO Service Frameworks 102, each framework presents to its clients 214 an interface which is consistent from platform to platform. Thus, the interface for a particular framework, Mass Storage, for example, would be the same for a PowerPC implementation as it would before an Intel Pentium or Motorola MC68040 implementation.

The Interrupt Services Framework 206 provides kernel-based services for managing multiple Interrupt Handlers 208, performing a first level interrupt decode and dispatch to the appropriate Interrupt Handler 208. This framework is also responsible for many management tasks.

The Interrupt handlers 208 (such interrupt handlers representing instantiations of the interrupt: handler framework 208) are device-specific abstractions which process device interrupts. This is an optional building block which is required only when the device being managed generates interrupts. Interrupt handlers run in kernel mode and thus have access to kernel privileged instructions and operations.

The Device Access Managers 210 (which are instantiations of the access manager framework 210) are user-mode abstractions that execute outside the kernel and are charged with all tasks associated with hardware access.

The hardware devices 212 in FIG. 2 represent the hardware devices which are being managed by the IO system of a preferred embodiment. Note that the access managers 210 and the interrupt handlers 208 communicate with the hardware devices 212.

The interrupt devices 206 are in communication with the kernel 204, which is preferably the Mach micro-kernel developed by IBM, which is well-known to those skilled in the relevant art.

Operation of the Object-Oriented Input/Output System

The IO system of a preferred embodiment operates preferably as follows.

A client 214 sends requests for services to a specific IO service framework 102 associated with the client. The IO service framework 102 uses its associated access manager 210 to load an appropriate device register with an appropriate command, such as "write a byte," "buffer a block," or whatever the appropriate action might be.

Interrupts progress from bottom to top in FIG. 2. The kernel based Interrupt Services Framework 206 catches processor interrupts and calls the interrupt handler 208 it has registered for a particular interrupt level or IRQ. The Interrupt Handler 208 queries the hardware and sends appropriate messages to its associated Device Access manager 210. The Device Access Manager 210 performs a hardware interface operation such as reading a buffer and notifies the appropriate IO service framework 102 via a method call or IPC (inter-process communication), as appropriate. Finally, the IO service framework 102 takes appropriate action, such as unblocking a client thread by sending it data.

Figure 3:
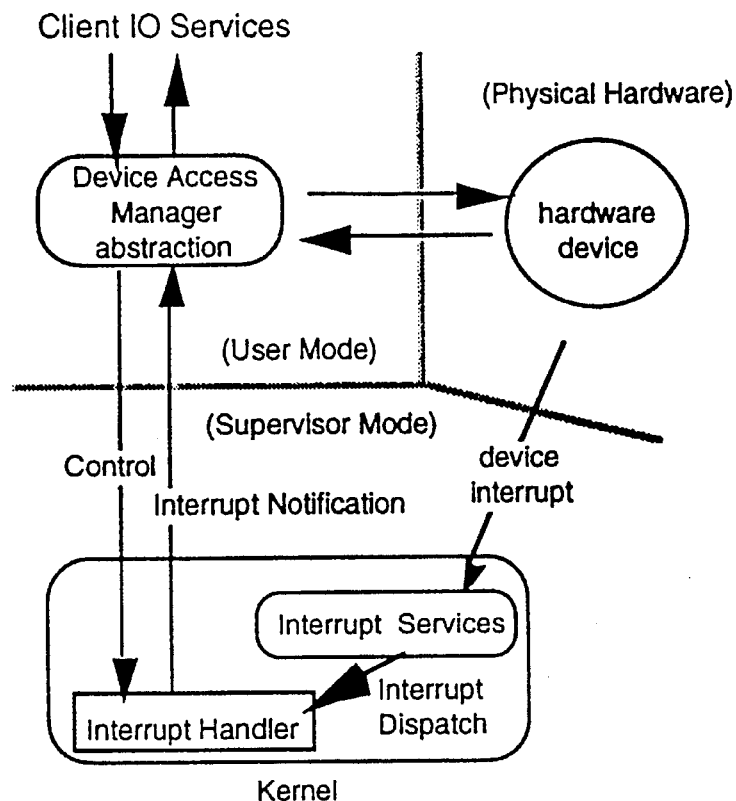
FIG. 3 illustrates abstractions involving a device access manager and an interrupt handler, and depicts the data flow between these elements of a preferred embodiment.

Any Device Access Manager 210 and its associated Interrupt Handler 208 could perform the functions; found in a conventional device driver, as shown in FIG. 3. Both the Device Access Manager 210 and Interrupt Handler 208 have a direct access to their hardware device 212. This allows the developer to balance function between the Device Access Manager 210 and the Interrupt Handler 208 to meet the implementation specific, overall design goals. With reasonably advanced IO hardware, functionality (and code volume) could be predominantly vested in the Device Access Manager 208 while the size and complexity of the Interrupt Handler 208 could be minimal.

The specific location of a feature or function is left to the designer. To what extent a feature resides in either the Device Access Manager 210 or Interrupt Handler 208 should be governed by the designer's requirements and the following rule: If there is not an overwhelming clear purpose for implementing the code in the Interrupt Handler 208, it should be in the Device Access Manager 210. This rule is based on the intent to keep Interrupt Handlers 208 as small and simple as possible (in view of practical considerations) to enhance performance.

Interrupt Handlers 208 are installed and removed at the request of their respective Device Access managers 210. Normally, there is a one-to-one mapping of Device Access Managers 210 to Interrupt Handlers 208. That is to say, each Device Access manager 210 usually installs only one Interrupt Handler 208. Exceptions to this one-to-one mapping are recognized and allowed for. Some of these exceptions might be: (1) a Device Access Manager for a polled device which generates no interrupts may not have to install any Interrupt Handler; (2) Some hardware may have multiple instances of homogenous devices capable of generating many distinct interrupts. (For example, ISA serial port cards with multiple UARTs.) In this case, the designer may elect to use a common Device Access Manager which would install Multiple Interrupt Handlers.

Referring again to FIG. 3, Device Access Managers and Interrupt Handlers communicate by using two standard interfaces. First, a Device Access Manager can initiate a bi-directional communication transaction by using a Control mechanism. Second, an Interrupt Handler can send a limited amount of data to any task through an Interrupt Notification service. The intent of this interface is to allow interrupt notification which communicates limited state information to the Device Access Manager. Any standard and appropriate communication interface can be used to implement the Control mechanism and Interrupt Notification service.

The operation of a preferred embodiment shall now be discussed in greater detail. The IO service framework 102 interacts with its Device Access Manager 210. The Device Access Manager 210 makes buffers ready by asking the memory management services to make the virtual address range ready for IO. The Device Access Manager 210 then interacts with the hardware device 212 directly or with the device Interrupt Handler 208 through the Control method.

The hardware device 212 accepts or supplies the requested data. At some point the hardware device 212 generates an interrupt that is received by the Interrupt Services Framework 206 and dispatched to the correct Interrupt Handler 208.

The Interrupt Handler 208 may access the hardware device 212 and examine the state of the hardware device 212. It then notifies the Device Access Manager 210 via the Interrupt Notification service, possibly sending some necessary state information with the notification.

Next, the Device Access Manager 208 unlocks the client's resident IO buffers. Finally, the Device Access Manager 208 informs the client 214 via one of the IO service frameworks 102 that the requested action has been completed.

Device Access Manager

Why have Device Access Managers 208 instead of classic drivers? The answer is in the expanded role that is required of the IO ensembles of a preferred embodiment. Each type of device has differences in access rules and protocol. Constricting this diversity into a "one-size-fits-all" interface abstraction is common practice among current OS architectures. To honor the goal of enabling innovation, it must be recognized that any given set of these access protocols may be diverse. Thus, each category of device must be allowed to define its own abstract interface. For example, printers and tap drives are unlikely to be shared among multiple clients. However, by using a different process policy, a printer port could give the illusion of being shared by managing a spooling queue. Thus, the Device Access Manager 210 can encapsulate, hide, and have control over its access policy.

Device access policy cannot be globally, clearly, or correctly predicted for all present and future devices. Attempts to do so will result in a constricted IO model which cannot adjust to new hardware innovations. A preferred embodiment does not set global IO access policy. Any global device access policy that might be imposed today would most likely be incorrect or inadequate in the future. The IO system of a preferred embodiment addresses this issue by deferring as many policy decisions as possible to the Device Access Managers 210. It is therefore a functional role of Device Access Managers 210 to define the access policy of the device.

Another reason for fire user-mode access manager 210 is to provide for the placement of device service functionality outside the kernel space. This has the advantages of reducing kernel bloat and enhancing system stability.

Interrupt Handlers

The Interrupt Handler 208 is an interrupt-source-specific abstraction that processes interrupts and runs within the kernel's address space. An Interrupt Handler 208 is device specific because its code has detailed knowledge of the target device 212. However, an Interrupt Handler 208 may be generic in the sense that it is capable of handling multiple instances of a device at different physical locations. (That is to say that an Interrupt Handler cannot field interrupt notifications for both a UART and a SCSI interface chip but may be able to field interrupts for multiple UART chips.)

All Interrupt Handlers are subclassed from an abstract base class TInterrupt Handler. The TInterrupt Handler class defines the required interface between device specific Interrupt Handlers and the kernel's Interrupt Services Framework. Objects in the device specific subclass, as well as any other objects used by the Interrupt Handler, are processed into a shared library.

The installation of an Interrupt Handler 208 by a Device Access Manager 210 initiates a "death watch" so the Interrupt Handler 208 may be removed automatically if the Device Access Manager 210 is destroyed. This way the system can guarantee that resources used by the Interrupt Handler 208 will be reclaimed when the Device Access Manager 210 is removed. This death watch is managed unobtrusively by the Interrupt Services Framework 206.

Interrupt Services Framework

The interrupt services framework 206 encapsulates kernel level services used by Interrupt Handlers 208 as well as providing interrupt decoding and dispatch to the appropriate Interrupt Handler 208. The services provided by the Interrupt Services Framework 206 include:

(1) Interrupt Handler Installation. All kernel resident Interrupt Handlers are installed by this framework.

(2) Management of IO Resources. This task involves tracking assigned and requested ranges of the IO address and interrupt spaces to insure conflicts are arbitrated. The arbitration of these resources is likely to be of a first-come, first-served nature, but may vary from this model depending on the hardware architecture and the specific implementation of the Interrupt Services framework 206.

(3) Management of Interrupt Handler Exceptions. It is the task of the Interrupt Services Framework 206 to be the ultimate handler of processor exceptions which occur at interrupt time. This responsibility involves logging the exception as well as invoking an exception handler. If the offending Interrupt handler 208 has specified a custom exception handler, it will be invoked; otherwise, a system default exception handler will be used.

(4) Device Access Manager Death Watch. It is this framework which watches for the destruction of access managers 210 and removes any associated Interrupt Handler 208 which is still installed.

(5) Interrupt Handler Removal. When a request to remove an Interrupt Handler 208 is received, it is the responsibility of this framework to do the work, assuming the requester has the appropriate rights. Usually, only the Device Access Manager 210 which installed the Interrupt Handler 208 has the right to remove it.

The Interrupt Services Framework must also construct and support the interrupt hierarchy. The interrupt hierarchy is an innovation which is vital to supporting location independent device abstractions, and is discussed below.

Hardware Hierarchy and Configuration

Figure 4:
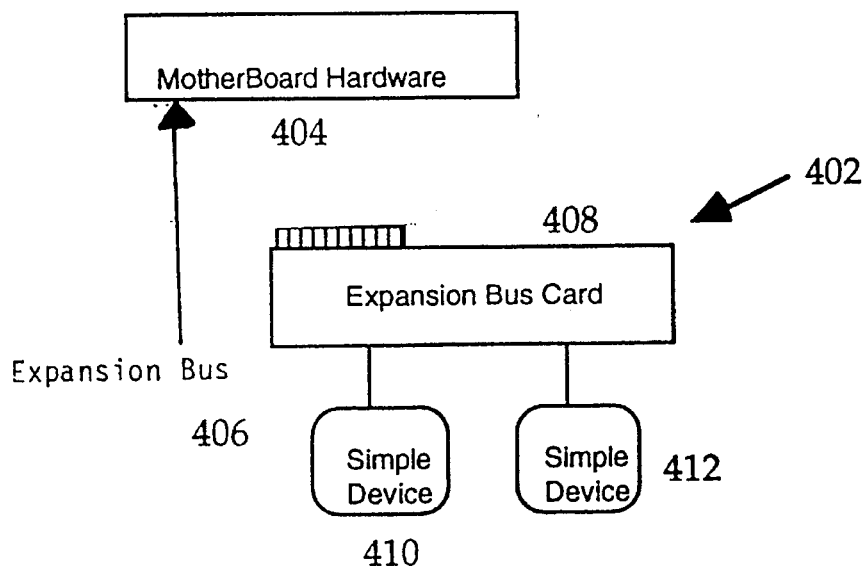
FIG. 4 illustrates an example hardware hierarchy in accordance with a preferred embodiment.

IO hardware devices can be attached to a system via many diverse hardware paths. Some are built-in on the motherboard, some are attached to buses (e.g., Micro Channel, NuBus, SCSI, IS), while other devices attach using a combination of several means. For example, a SCSI drive could be connected to a NuBus card with a SCSI chip on it. A simplifying abstraction is to view these different hardware configurations as a collection of hardware hierarchies. FIG. 4 provides an example of such a hardware hierarchy.

The hierarchy of FIG. 4 could be outlined as:

MotherBoard Hardware

Expansion Bus Card

Simple Device A

Simple Device B

By projecting this hardware hierarchy into the software domain, a preferred embodiment achieves a significant degree of flexibility and encapsulates specialized device knowledge at an appropriate level. This is described below.

Software Hierarchy

Figure 5:
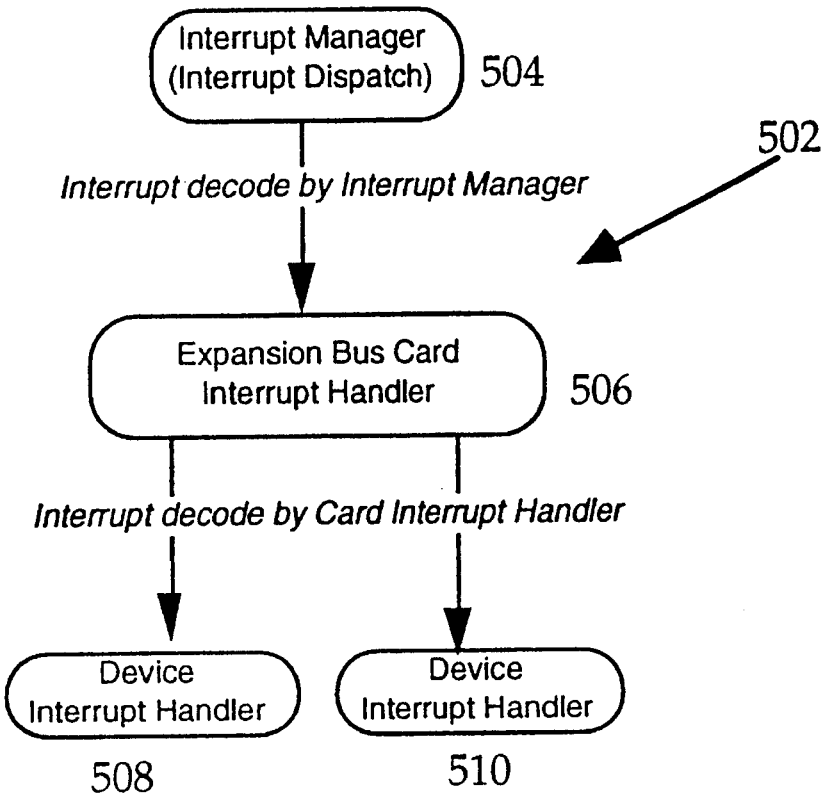
FIG. 5 is a software hierarchy corresponding to the hardware hierarchy of FIG. 4 in accordance with a preferred embodiment.

The view of hardware as a hierarchy leads to the view that the software for these devices is also a hierarchy. A hierarchical view of software nicely restricts the scope of knowledge to appropriate layers of the hierarchy. By limiting the scope of this knowledge it is possible to push IO policy issues to the lowest levels of the hierarchy. Upon the occurrence of an interrupt, control is passed down the hierarchy until the correct Interrupt Handler 208 processes the interrupt. This is depicted in FIG. 5.

This software hierarchy is not limited to interrupt processing but spans the concerns of automatic system configuration as well. When the "root" of a hardware hierarchy is found, the root of the software hierarchy is created. The task of this software root is to find and instantiate each node of the software hierarchy as it finds new hardware nodes. A more detailed description of this aspect of a preferred embodiment is in the section on Configuration Access Managers, below.

Parent/Child Relationship

The hierarchical view of the IO architecture of a preferred embodiment uses simple parent/child relationships to manage all the nodes in the software hierarchy. Each Interrupt Handler 208 and Device Access Manager 210 has a parent relationship and may or may not have a child relationship. These parent/child relationships form the model for managing such a hierarchical abstraction. The set of all of these associations naturally and dynamically define the topology of the software hierarchy. This definition accomplishes two important goals: (a) it defines how (and in which order) the software hierarchy is constructed; and (b) it describes the flow of control when an interrupt occurs.

Defining the nodes in the hierarchy is a simple task for most IO hardware. However, in a few cases the job of distinguishing parent/child relationships is not clear. The Zilog Z8530 SCC chip is an example. This chip has two distinct serial ports (A and B) and a common interrupt register. The obvious initial design is to define two serial ports and have an Interrupt Handler for each. However, when the Interrupt Handler for port A reads the interrupt register, it obtains interrupt status for both ports and clears the register by this action. Certainly, the concept of independent Interrupt Handlers would not work for this case.

Figure 6:
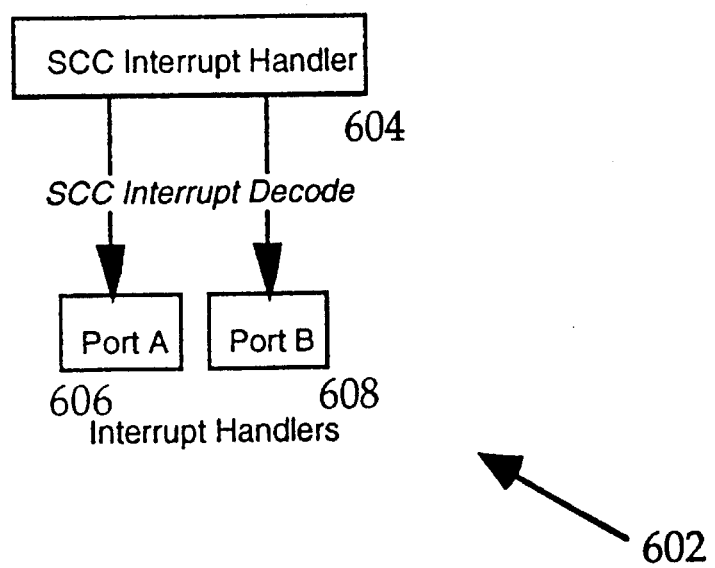
FIG. 6 illustrates a parent/child relationship in accordance with a preferred embodiment.

The solution is to define two levels of abstraction, the chip and the port. This is depicted in FIG. 6, wherein the chip abstraction is the parent and exports two software-independent serial ports. When some client application (MIDI, for example) needs to use its assigned port, it would first acquire the correct parent Interrupt Handler object (the chip Interrupt Handler) and ask to have the MIDI Interrupt Handler installed as a child to this parent.

The above has discussed how the parent/child relationship is used to construct the software hierarchy. The flow of control in the interrupt case shall now be considered.

Continuing the above example (FIG. 6), assume that SCC port B asserts an interrupt. The motherboard routes the interrupt signal to the processor and the program counter is vectored into the Interrupt Services Framework. The Interrupt Services Framework decodes the processor interrupt and dispatches the SCC Interrupt Handler.

The SCC Interrupt Handler reads the interrupt register (thereby clearing the interrupt status bits), and decodes the values that it finds and determines that port B has generated the interrupt. It calls an Interrupt Services Framework service InvokeChild to dispatch the port B Interrupt Handler, passing a copy of the interrupt register in a "parent object."

It is important to note that the SCC Interrupt Handler does not need to know what handler is the currently active child for port B. It is only significant for it to know that the child should field the interrupt.

Should the interrupt register also indicate a port A interrupt, the SCC Interrupt Handler will similarly dispatch the port A Interrupt Handler upon completion of the interrupt service for port B. In this way the individual port Interrupt Handlers will never need to perform a destructive read of the shared interrupt register.

Configuration Access Managers

Configuration Access Managers are Device Access Managers 210 with the additional responsibility for the configuration of a collection of devices, and they are the dominant element in the Plug and Play objective of a preferred embodiment. There are two kinds of Configuration Access Managers. The first has a fixed set of devices to configure and therefore has a straightforward configuration task. The second has to configure any number of "untyped" devices. This second form of Configuration Access Manager must utilize some protocol to determine both the number and the type of devices present before it can complete its configuration task.

When any Configuration Access Manager is started, it is required to find all the devices for which it is responsible. After all its devices have been found and identified, the Configuration Access Manager would then make a policy decision: either instantiate the appropriate Device Access Manager 210 or simply record that the device was found but not linked with a Device Access Manager 210.

Figure 7:
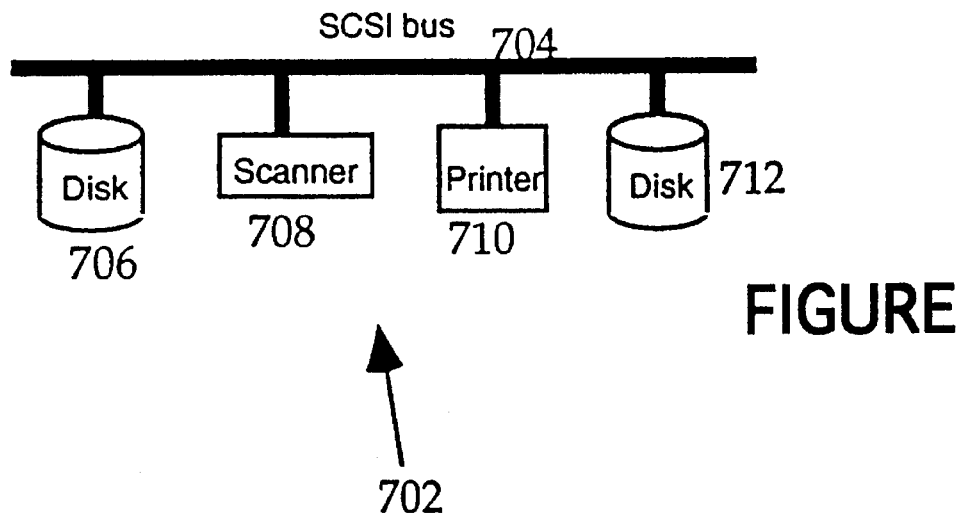
FIG. 7 is a block diagram of an example SCSI bus configuration in accordance with a preferred embodiment.

Consider FIG. 7, wherein a SCSI bus Configuration Access Manager would have to follow the standard SCSI protocol to identify what devices are currently attached to the SCSI bus 704. After a device is found, the Configuration Access Manager would then decide which device-specific Device Access Manager should be instantiated.

An example of a fixed set of devices to configure could be found on an expansion card with several devices. In this type of Configuration Access Manager, the policy decision would be hard-coded. For an expansion card containing two SCSI controllers, the SCSI chips would be known to the card's Configuration Access Manager. The devices on each of those SCSI buses would have to be configured by a SCSI bus Configuration Access Manager.

This example shows that the model of Configuration Access Manager can be applied recursively. The use of a software hierarchy to manage an arbitrary hardware hierarchy allows the IO system to dynamically configure any hardware platform or configuration.

Data Transfer and the Device Access Manager

Data can be transferred to and from a hardware device by the processor (programmed IO) or by the hardware (Direct Memory Access, DMA). Channel Processing, the use of a dedicated IO processor together with DMA, represents a combination of these transfer options.

That programmed IO is supported by a preferred embodiment should be apparent from the above examples of Device Access Managers.

A set of DMA related services are available to device interface ensembles. These services include: (a) Dynamic assignment of DMA channels to clients; (b) Support for scattered-read, gathered-write (also known as scatter-gather); (c) Encapsulation of hardware limitation (such as the 24 bit addressing limit of ISA bus hardware). The DMA services allow DMA devices on the systems by providing an intermediate buffer in the preferably lower 16 Mb of physical memory. Since this capability slows down the data transfer, it is optional; and (d) DMA services classes may be subclassed to support third-party bus masters.

These DMA services are targeted at better hardware support than is found on ISA systems. As the hardware base advances, the DMA model may delete some features necessary for support of the ISA bus legacy. On MCA, EISA and other wide bus architectures, such features should not be necessary.

Architectural Example

As stated above, a preferred embodiment enables the reuse of object technology and the use of abstractions to move IO software forward. An example illustrating these advantages of a preferred embodiment is considered in this section.

Figure 8:
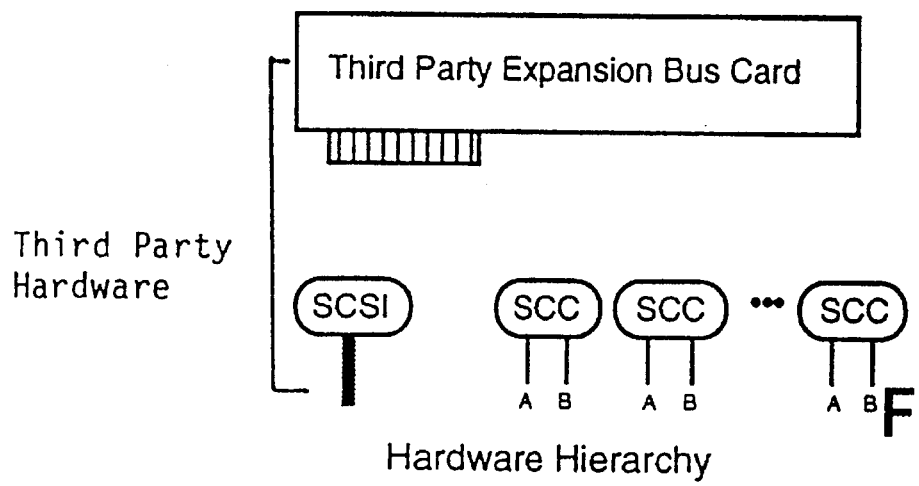
FIG. 8 illustrates artother example hardware hierarchy used for illustrating the features of a preferred embodiment.

Suppose a third party developer decides to make and market a simple value-added card. Market research exposes the need for an expansion card with a SCSI bus and several serial ports (see FIG. 8). The developer chooses to use the same IO chips that the target OEM uses.

Building the hardware card is straightforward, but how much software does this third party developer have to write? According to a preferred embodiment, the developer would have to write very little software. This is the case, since most of the software to control the card is supplied by existing ensembles.

Figure 9:
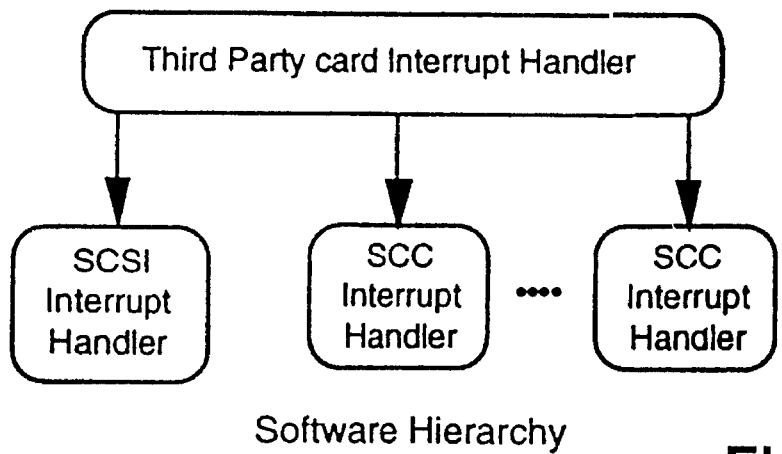
FIG. 9 illustrates a software hierarchy corresponding to the hardware hierarchy of FIG. 8 in accordance with a preferred embodiment.

Because of leverage at both the hardware and software level, this third party developer only had to develop a small part of the software solution. Referring to FIG. 9, his contribution was the Third Party card Interrupt Handler and the card-specific Configuration Access Manager (not shown in FIG. 9). The rest of the ensemble was provided by others.

Support for Multiple Processors

The IO system of a preferred embodiment preferably tracks the Multi-Processing (MP) capabilities of the underlying kernel. MP support is preferably focused on Symmetric Multi-Processing (SMP) utilizing the well known Uniform Memory Access (UMA) model.

The ability to support device ensembles for any MP configuration is dependent on appropriate kernel supported and implementation specific synchronization primitives. For Interrupt Handlers (in-kernel synchronization), a TInterrupt- Mutex synchronization mechanism is required. For device Access Managers and other user-mode abstractions, the system's standard set of user mode synchronization services (monitors, semaphores, and the like) will be sufficient.

Operating System Independent Environment

The I/O system services of a preferred embodiment are implemented in an operating system-independent environment. This environment includes the necessary runtime support and a variety of fundamental services (communication services, interfaces to the kernel, streams, timing, basic collections, and other related services) required to support the I/O servers. This environment enables the I/O servers to be written and to execute independently, that is, with no reliance upon particular characteristics of a unique operating system.

Operating System Independent Interfaces

The I/O services of a preferred embodiment are designed and interfaces specified in a manner which enables a variety of operating system environments to map their I/O interface syntax and semantics to the operating system independent interfaces supported by these I/O services. This design enables I/O servers to be deployed across a variety of operating systems via a single shrink-wrapped implementation.

While various embodiments of a preferred embodiment have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Having thus described our invention, what we claim as new, and desire to secure by Letters Patent is:

1. Apparatus for constructing hardware device interface software systems for servicing Input/Output (IO) devices, the apparatus comprising:

(a) a processor;

(b) a memory attached to and under the control of the processor;

(c) at least one IO device attached to the processor; and (d) an IO service ensemble, responsive to IO requests from a user, for providing a pre-defined set of IO services for the device, the ensemble including interrupt handler means, residing in a kernel address space of the memory, for servicing interrupts from the device; and device access manager means, residing in a user-mode address space of the memory and cooperating with the interrupt handler means, for accessing the device according to user-provided, device-specific access rules to iniate an IO operation with the device and for reserving buffers in the memory, if necessary, to service the IO requests and to service responses from the device, the device access manager means including means for installing the interrupt handler means in the memory and including death watch means for removing the interrupt handler means from the memory if the device access manager means is destroyed.

2. A method for constructing hardware device interface software systems for servicing Input/Output (IO) devices on a computer system having a processor, a memory, an operating system, and an IO device, the method comprising the steps of:
(a) creating in the memory an IO service ensemble for providing a pre-defined set of IO services for the device, the ensemble including a device access manager in a user-mode address space of the memory and an interrupt handler in a kernel address space of the memory;
(b) creating the interrupt handler to include mechanisms for servicing interrupts from the device; and
(c) creating the device access manager to include a mechanism for accessing the device according to user-provided, device-specfic access rules to initiate an IO operation with the device and to include a mechanism for reserving buffers in the memory, if necessary, to service IO requests and to service IO responses from the device, and to include a mechanism for detecting whether the device access manager is destructed and for removing the interrupt handler in response to detecting the destruction of the device access manager.

3. The apparatus of claim 1 wherein the pre-defined set of IO services provided by the IO ensemble is independent of an underlying operating system under which the hardware device interface software system operates.

4. The method of claim 2 wherein the pre-defined set of IO services provided by the IO ensemble is independednt of an underlying operating system under which the hardware device interface software system operates.

5. Apparatus for providing input/output services from a hardware device which generates a processor interrupt in a multi-tasking computer system having a memory partitioned into a plurality of address spaces, the computer system having an application program operating in an application program address space and an operating system kernel operating in a kernel address space, the apparatus comprising:
(a) an IO service framework object having a plurality of subroutines therein for providing data to, and receiving messages from, the application program in a format which is operating system independent;
(b) interrupt service means located in the kernel address space and having direct access to the hardware device, the interrupt service means being responsive to the processor interrupt for determining the status of the hardware device and generating a notification message based on the determined status;
(c) a device access manager object located in the application program address space and having direct access to the hardware device, the device access manager being responsive to the notification message for retrieving data from the hardware device and for executing a subroutine in the IO service framework object for providing the data to the application program;
wherein the interrupt service means comprises means responsive to control signals generated by the device access manager for installing one of the plurality of interrupt handlers in the kernel address space; and
wherein the device access manager can be destoryed and the interrupt service means comprises means responsive to a destruction of the device access manager for removing the one interrupt handler program from the kernel address space.

6. Apparatus according to claim 5 wherein the interrupt service means comprises a plurality of interrupt handler programs and an interrupt service program responsive to the processor interrupt from the hardware device for executing one of the plurality of interrupt handler programs.

7. Apparatus according to claim 5 wherein the device manager object further comprises means for generating control signals formatted in an operating system independent manner, means for sending the control signals to the interrupt handler program and means for receiving control signals formatted in an operating system independent manner from the interrupt handler program.

8. Apparatus according to claim 5 wherein the device manager object further comprises means for allocating data transfer buffers in the memory.

9. Apparatus according to claim 5 wherein the interrupt service means comprises means responsive to control signals generated by the device access manager for removing the one interrupt handler program from the kernel address space.

10. Apparatus according to claim 5 for providing input/output services from a plurality of hardware devices and the apparatus further comprises:
(d) a plurality of device access managers, each of the plurality of device access managers having direct access to one of the plurality hardware devices.

11. Apparatus according to claim 10 wherein the interrupt service means is responsive to control signals generated by each of the plurality of device access managers for installing an interrupt handler program in the kernel address space for each of the plurality of device access managers.

12. Apparatus according to claim 5 wherein the IO service framework object comprises means responsive to a plurality of operating system independent commands generated by the application program for accessing the hardware device and for generating a series of control signals to control the interrupt service means in order to perform the commands.

13. Apparatus for providing input/output services from a hardware device which generates a processor interrupt in a multi-tasking computer system having a memory partitioned into a plurality of address spaces, the computer system having an application program operating in an application program address space and an operating system kernel operating in a kernel address space, the apparatus comprising:
(a) an IO service framework object having a plurality of subroutines therein for providing data to, and receiving messages from, the application program in a format which is operating system independent;
(b) a plurality of interrupt handlers, each of the plurality of interrupt handlers comprising means for responding to a processor interrupt and generating a notification message;
(c) interrupt service means located in the kernel address space and having direct access to the hardware device, the interrupt service means being responsive to the processor interrupt for determining the status of the hardware device and for invoking one of the plurality of interrupt handlers based on the status of the hardware device;
(d) a device access manager object located in the application program address space and having direct access to the hardware device, the device access manager being responsive to the notification message for retrieving data from the hardware device, for executing a subroutine in the IO service framework object for providing the data to the application program and for receiving operating-system independent commands from the application program to control and configure the hardware device;
wherein the interrupt service means is responsive to control signals generated by each of the plurality of the device access managers for installing an interrupt handler program in the kernel address space for each of the plurality of device access mangers; and wherein any of the plurality of device access managers can be destroyed and the interrupt service means comprises means responsive to a destruction of the particular device access manager for removing the one interrupt handler program from the kernel address space.

14. Apparatus according to claim 13 wherein the device manager object further comprises means for allocating data transfer buffers in the memory.

15. Apparatus according to claim 13 for providing input/output services from a plurality of hardware devices and the apparatus further comprises:

(e) a plurality of device access managers, each of the plurality of device access managers having direct access to one of the plurality hardware devices and being associated with the plurality of hardware devices on a one-to-one basis.

16. A method for providing input/output services from a hardware device which generates a processor interrupt in a multi-tasking computer system having a memory partitioned into a plurality of address spaces, the computer system having an application program operating in an application program address space and an operating system kernel operating in a kernel address space, the method comprising the steps of:

(a) creating an IO service framework object having a plurality of subroutines therein for providing data to, and receiving messages from, the application program in a format which is operating system independent;

(b) creating in the kernel address space an interrupt service means having direct access to the hardware device, the interrupt service means being responsive to the processor interrupt for determining the status of the hardware device and generating a notification message based on the determined status;

(c) creating in the application program address space a device access manager object having direct access to the hardware device, the device access manager being responsive to the notification message for retrieving data from the hardware device and for executing a subroutine in the IO service framework object for providing the data to the application program;

wherein step (b) comprise the step of installing one of the plurality of interrupt handlers in the kernel address space in response to control signals generated by the device access manager; and wherein step (b) further comprises the step of removing the one interrupt handler program from the kernel address space when a device access manager is destroyed.

17. A method according to claim 16 wherein step (b) comprises the steps of:

(b1) creating a plurality of interrupt handler programs in the kernel address space; and (b2) creating an interrupt service program responsive to the processor interrupt from the hardware device for executing one of the plurality of interrupt handler programs.

18. A method according to claim 16 wherein step (c) comprises the steps of:

(c1) generating control signals formatted in an operating system independent manner;

(c2) sending the control signals to the interrupt handler program; and (c3) receiving control signals formatted in an operating system independent manner from the interrupt handler program.

19. A method according to claim 16 wherein step (c) further comprises the step of:

(c4) allocating data transfer buffers in the memory.

20. A method according to claim 16 wherein step (b) comprises the step of:

(b4) removing the one interrupt handler program from the kernel address space in response to control signals generated by the device access manager.

21. A method according to claim 16 for providing input/output services from a plurality of hardware devices, wherein the method further comprises the step of:

(d) creating a plurality of device access managers, each of the plurality of device access managers having direct access to one of the plurality hardware devices.

22. A method according to claim 21 wherein step (c) comprises the step of:

(c5) installing an interrupt handler program in the kernel address space for each of the plurality of device access managers in response to control signals generated by each of the plurality of device access managers.

23. A method according to claim 16 wherein step (a) comprises the step of:

(a1) accessing the hardware device and for generating a series of control signals to control the interrupt service means in order to perform the commands in response to a plurality of operating system independent commands generated by the application program.

* * * * *